United States Patent [19]
Madsen

[11] 3,875,497
[45] Apr. 1, 1975

[54] WATERBORNE MAGNETIC ANOMALY DETECTION SYSTEM AND APPARATUS

[75] Inventor: Andrew Madsen, Alamo, Calif.

[73] Assignee: Seatrek Ltd., Georgetown, Cayman Islands, British W. Indies

[22] Filed: Dec. 26, 1973

[21] Appl. No.: 427,518

[52] U.S. Cl. .................................... 324/3, 324/8
[51] Int. Cl. ............................................ G01v 3/08
[58] Field of Search .............................. 324/3–9

[56] References Cited
UNITED STATES PATENTS

| | | | |
|---|---|---|---|
| 3,020,470 | 2/1962 | Shawhan et al. | 324/3 |
| 3,052,837 | 9/1962 | Arbogast et al. | 324/3 |
| 3,182,250 | 5/1965 | Mayes | 324/9 X |
| 3,361,957 | 1/1968 | Hings | 324/9 X |
| 3,490,032 | 1/1970 | Zurflueh | 324/3 X |
| 3,514,693 | 5/1970 | Cagniard | 324/8 X |

*Primary Examiner*—Gerard R. Strecker
*Attorney, Agent, or Firm*—Roger A. Marrs

[57] ABSTRACT

A detection system and apparatus is disclosed herein having a remotely controlled waterborne drone for towing a pair of separated, spaced apart magnetometers adapted to sense and detect submerged magnetic fields. The drone is directed to follow a predetermined course over potential magnetic field target zones. Magnetic signatures are sensed and relayed to a control station for processing via a graphic display readout. The control station is a command vessel carrying drone path control equipment, data processing equipment and central control information interpretation equipment.

1 Claim, 6 Drawing Figures

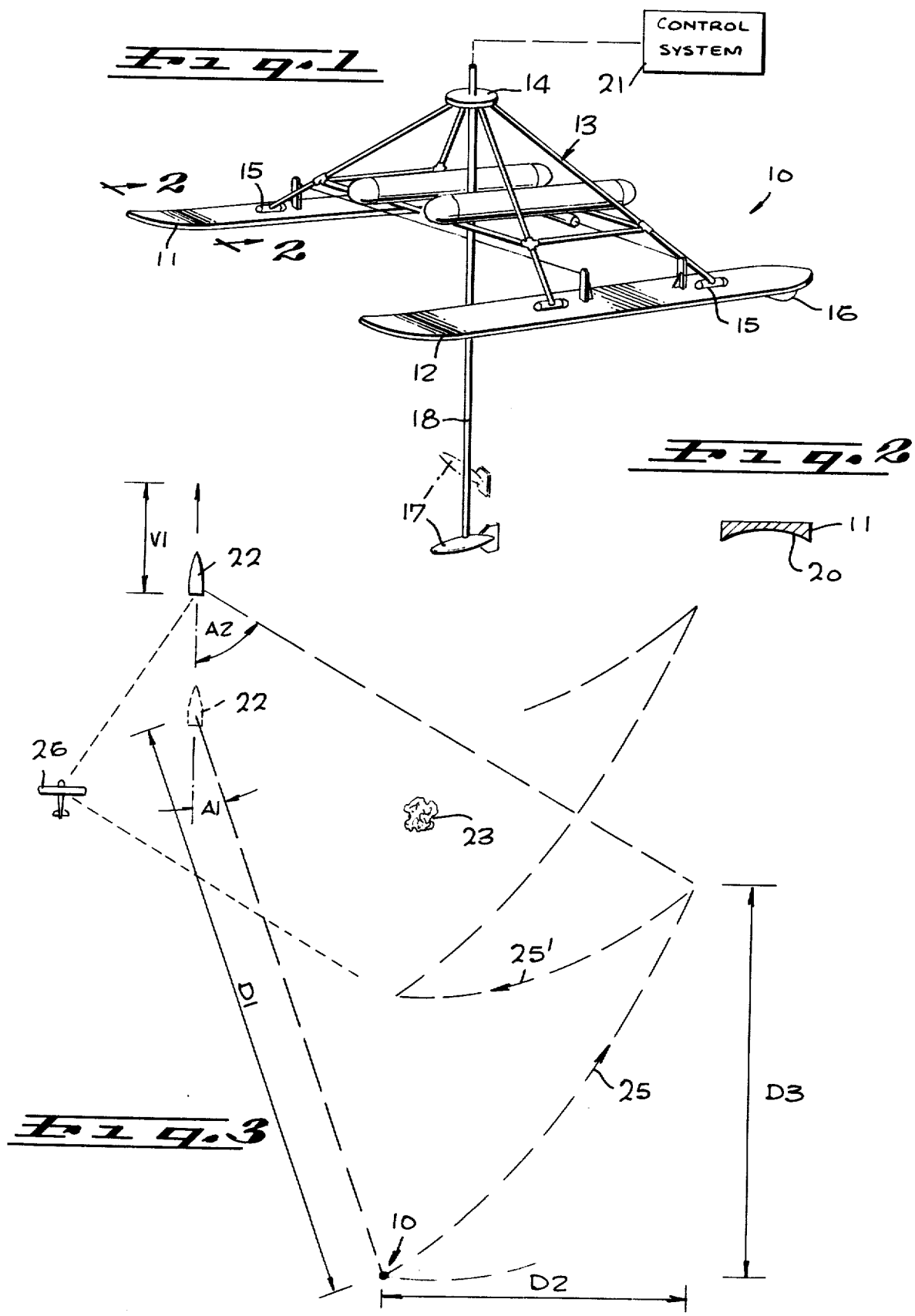

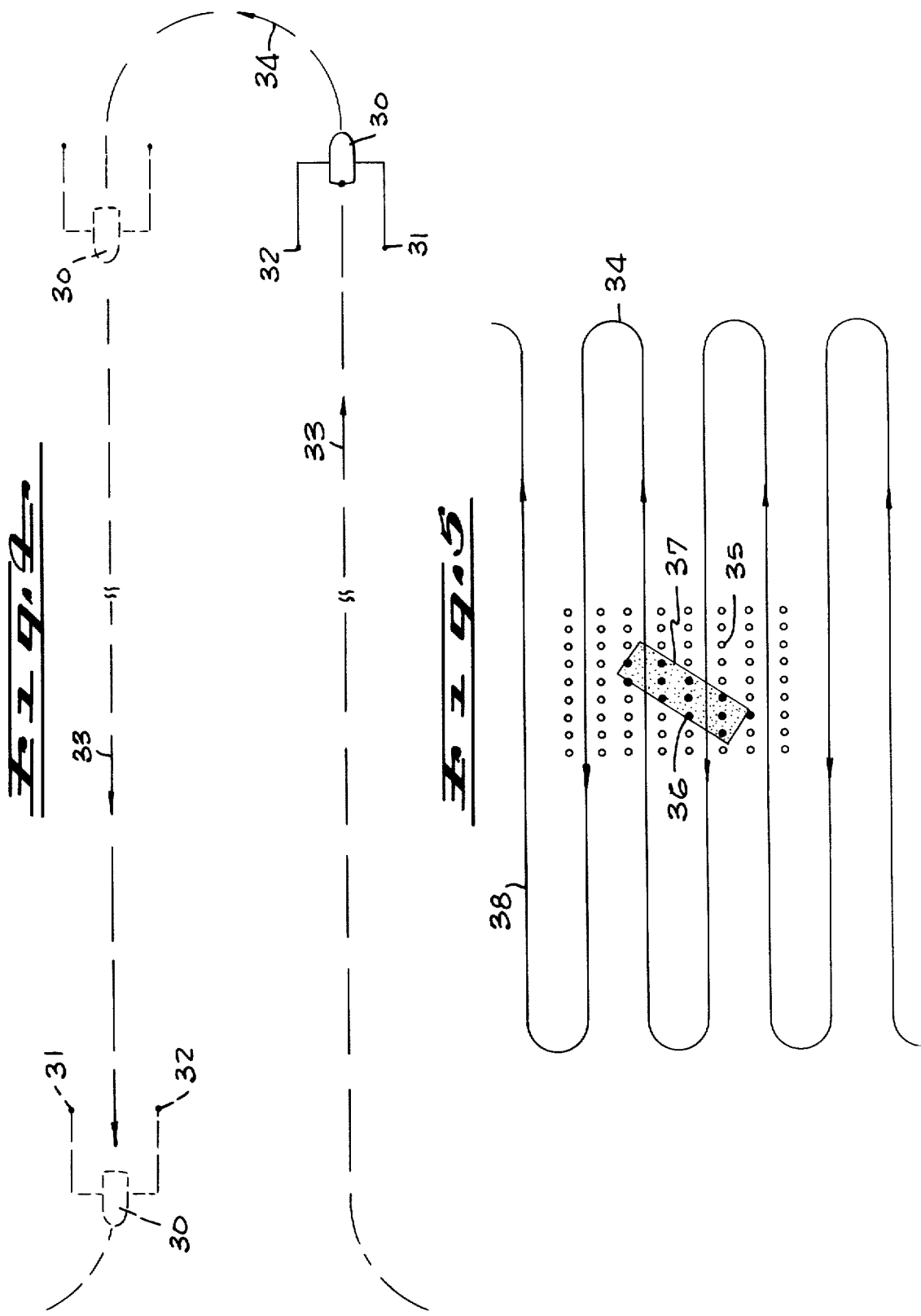

WATERBORNE MAGNETIC ANOMALY DETECTION SYSTEM AND APPARATUS

BACKGROUND OF THE INVENTION

1. Field of the Invention

This invention relates to sea floor exploration systems and more particularly to a novel reconnaissance system and apparatus employing a remotely controlled waterborne platform directed to transverse a programed path while towing a pair of gradiometer sensors adapted to detect magnetic fields.

2. Brief Description of the Prior Art

In the past, it has been extremely difficult to locate and uncover submerged articles of value. The search and recovery of underwater articles is difficult due to the face that some shipwreck remains and cargo are scattered over a wide area and since many of the shipwrecks have been submerged for a long period of time resulting in various articles being encrusted with sea-growth and the like. It has been the conventional practice to locate such articles by employing divers to search the sea floor by swimming or walking over a particular area being investigated. Obviously, such a precedure is inefficient since it is time consuming and exploration is limited to a very small area.

Other recent attempts have been made to improve underwater exploration for locating and defining certain types of shipwrecks and their cargoes which involve the use of electronic search equipment such as magnetometers or other sensors which allow precise detection and location of very small or large articles. Although such sensors have been successful in locating a variety of submerged objects, no prior effort has been made to provide an apparatus or means for directing a sensor over a prescribed field of exploration in a predetermined and precise pattern so as to increase search area and reduce search time. Also, no attempt has been made to remotely control the direction of the magnetometer or other sensors and to collect information or data derived from the sensor for introduction into computer systems for analysis and direct readout. Therefore, prior efforts using magnetometers to locate shipwreck remains appears to relay heavily upon chance or psychic experience. The difficulties encountered being interpretation of a mass of statistical data with a low order of signal-to-noise and the extremely demanding task of establishing spacial relationship.

Therefore, a long standing need has existed to provide a novel reconnaissance system for the purpose of exploring for valuable shipwrecks and the cargoes thereof.

SUMMARY OF THE INVENTION

Accordingly, the above problems and difficulties have been obviated by the present invention which provides a novel sea floor exploration system incorporating a waterborne data acquisition complex designed to locate and define certain shipwrecks remains. The invention includes a remotely controlled waterborne platform designed as a drone boat that is programmed to make a series of sequential transverses over potential target zones. A pair of proton magnetometers are towed aft of the platform for sensing magnetic signatures of submerged targets. Magnetic information derived from the magnetometers is transmitted to a control station where it is processed by computer techniques into a graphic display readout. The readout supplies a pictorial chart or map in near real-time of magnetic anomalies on the seafloor.

Therefore, it is among the primary objects of the present invention to provide a novel reconnaissance system for sea floor exploration employing remotely controlled waterborne equipment programmed to make a series of sequential transverses over potential target areas.

Another object of the present invention is to provide a novel reconnaissance system employing remotely controlled waterborne equipment for quickly mapping and charting submerged target areas.

Another object of the present invention is to provide a novel exploration system employing apparatus and a system for providing a series of programmed sequential transverses over a fine grid search pattern.

Still a further object of the present invention is to provide a novel underwater exploration system that is remotely controlled and which will readily chart or map underwater sensed magnetic fields in a rapid manner and at a relatively low cost.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a perspective view of a novel towed waterborne vehicle mounting sensors or detectors intended to be pulled across a search exploration pattern;

FIG. 2 is an enlarged transverse cross-sectional view of a portion of the water vehicle shown in FIG. 1 as taken in direction of arrows 2—2 thereof;

FIG. 3 is a plan view illustrating a novel search pattern traveled by the drone waterborne vehicle in accordance with a predetermined pattern;

FIG. 4 is a plan view illustrating another search pattern intended to be following by the waterborne vehicle while towing detection equipment;

FIG. 5 is a plan view of a complete search pattern employing the sequential transverses of the pattern showin in FIG. 4.

DESCRIPTION OF THE PREFERRED EMBODIMENT

Figure 6:
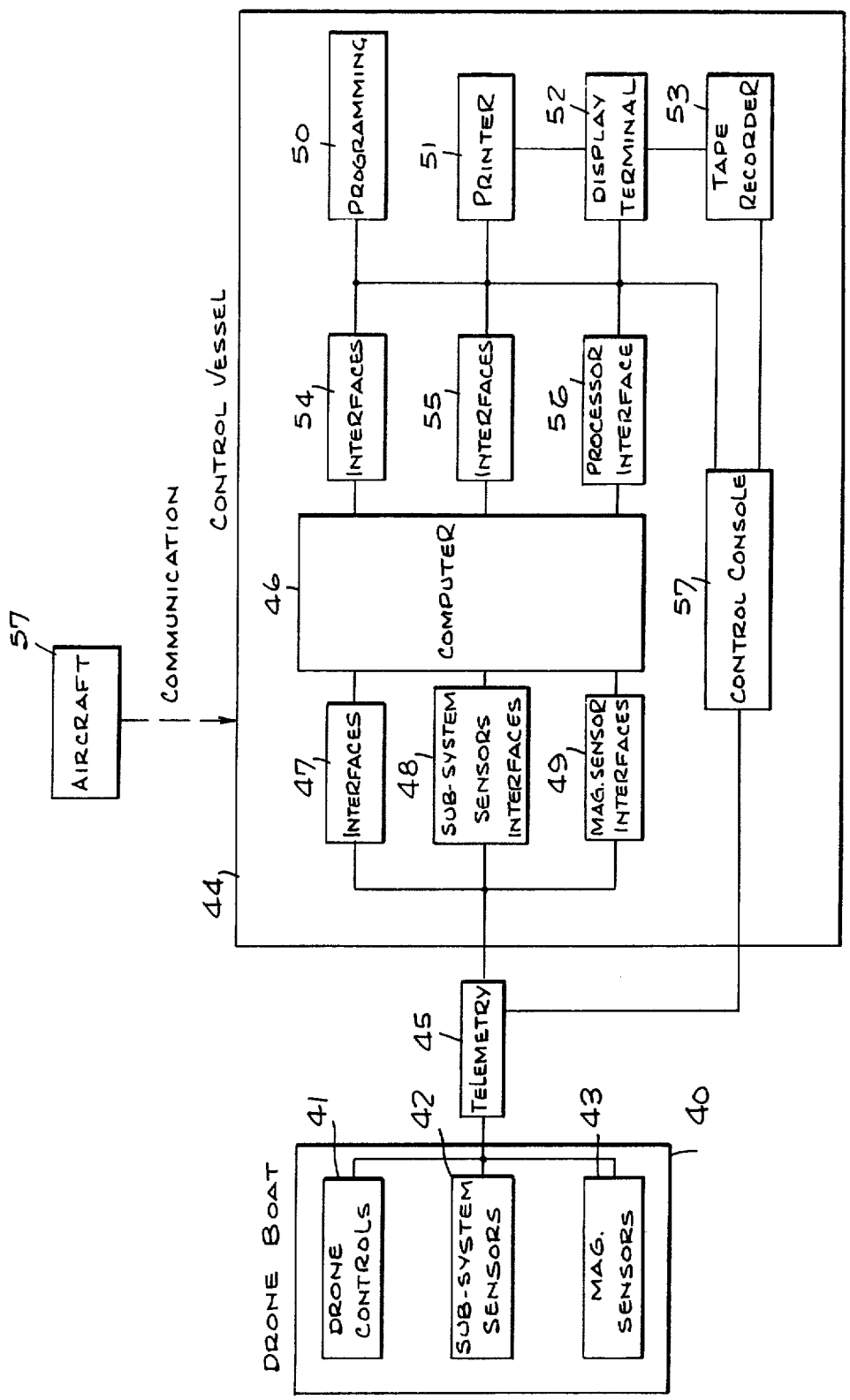
FIG. 6 is a diagramadic block diagram illustrating information flow for sensing or sampling areas of interest and for sensing magnetic signatures of located targets as well as control signals for operating the various equipments incorporated into the system.

Referring now to FIG. 1, a novel waterborne platform is indicated in the direction of arrow 10 taking the form of a ski vehicle intended to be towed by a conventional boat. The vehicle 10 includes a pair of skis 11 and 12 which are arranged in fixed parallel spaced apart relationship by means of a frame generally indicated by numeral 13. The frame 13 includes a plurality of braces extending from each of the skis to a common control head 14. The opposite ends of the braces are pivotally carried on the skis such as indicated by pivot mechanism 15 associated with ski 12. Each of the skis includes a stabilizing skag such as indicated by numeral 16.

A magnetometer sensor is indicated by numeral 17 and is downwardly suspended by means of a rod 18 from the control head 14. The sensor may be submerged or carried clear of the ocean surface. The positive bouyancy skis are approximately 12 feet in length and are on a 12 foot stance. Transverse directional control is gained by the side angle-of-attack of the coupled skis. FIG. 2 more clearly illustrates the concave undersurface of each of the skis as indicated by numeral 20. This provides for suitable stabilization while the platform is being towed.

Preferably, the magnetometer 17 is a proton magnetometer with sensitivity of 0.25 gamma and a fast sampling rate is intended to be employed. Both analog and digital outputs may be available from the control head 14. By means of the novel ski rig for the sensor, a new realm for magnetic anomaly marine survey is permitted. The sensor housing rudders to the direction of ski rig travel when in the submerged mode of operation. Design permits the sensor to track with a minimum of yaw, roll, and pitch motion. Sea state induced vibrations are effectively dampened by the suspension linkage. Provisions for ballasting is provided so as to accomodate various sea/wind conditions and scan patterns. Components, inclusive of the remote control mechanism and feedback sensors, are non-magnetic, as is the entire assembly.

The control system for the ski rig as well as for the magnetometer or sensing elements are indicated by the block 21 and it is to be understood that the control system is remotely located in another control vessel housing the computer analysis equipment.

With reference to FIG. 3, it is to be understood that the exploration system of the present invention is a waterborne data acquisition complex designed to locate and define certain types of shipwrecks and their contents. The remotely controlled waterborne platform 10 is programmed to make sequential transverses, hence a wide sweep of potential target areas is covered. The system also has the special ability to reconnoiter prime target areas that heretofore were not available to magnetic anomaly detection methods. The magnetic anomaly information can prove to be the index to the site of the shipwreck and its cargo and the treasures of sunken ships as an example. Computer techniques coupled with a video system organize and display the information derived by the sensor 17 in real-time.

The scan pattern shown in FIG. 3 allows the towing vessel indicated by numeral 22 to stay clear of hazards while making a reconnaissance of high probability target areas. For example, towing velocity VI of 20 feet per second (11.85 knots) and a tow cable length D1 of 500 feet will provide an effective scan width S of less than 340 feet. Tow angles A1, A2, for this example are 160° and 120° relative to the towing vessel heading. The sweep area will exceed 24,000,000 square feet per hour.

The system capabilities are to display in real-time, a pictorial presentation of magnetic anomalies on and beneath the sea floor. Repeatability of locating target areas is insured by inertial guidance information recorded on video tape. The real-time cumulative pictorial display is an augmented false color readout. The computer relates in a manner to give a continual spacial picture of the sea floors magnetic field. Video-tape recording of the acquired data allows detailed anaylsis and security.

The target in the exploration area is identified by numeral 23 and the tow line connecting the towing vessel 22 with the towed platform 10 is indicated by numeral 24. The platform 10 follows the pattern shown in broken lines by the arrows 25 and 25'. The transverse is indicated in length by dimension D3 and in width by dimension D2. As an assist to overall data gathering system, an aircraft 26 may be employed for aerial surveyance.

Referring now to FIG. 4, another pattern is illustrated whereby the remotely controlled waterborne platform is indicated by a small boat 30 which may be referred to a drone boat and which is programmed to make a series of sequential transverses over potential target zones. A pair of proton magnetometers are indicated by numerals 31 and 32 which are towed from the boat 30 in the direction illustrated in broken lines by the plurality of arrows such as indicated by numeral 33. The magnetometers are towed aft of the boat or platform 30 so as to sense magnetic signatures of targets beneath the water over which the boat travels. Sampling is accomplished on a 15 foot grid and hence, an area of interest is closely interrogated. The magnetic information sensed by the magnetometer is transmitted to the control station on the control vessel 22 where the information is processed by computer techniques into a graphic display readout. The readout supplies a pictorial map, in near real-time, of magnetic anomalies of the sea floor. As is indicated with respect to the pattern in FIG. 3, reconnaissance of the potential target areas may be made from the air by a spotter aircraft 26 that is simultaneously conducted so that the charting operation can be directed to areas that would have incurred shipwrecks and support salvage operations.

With respect to the sequential transverse pattern shown in FIG. 4, it is preferred that the drone boat 30 be a tri-hull vessel having twin outboard motors equipped with servo mechanisms to control direction of travel and velocity. A series of programmed sequential transverses are conducted for a fine grid search pattern. The two proton magnetometer sensors 31 and 32 are towed in a transverse gradiant, horizontal and perpendiclar to the drone boat course. The magnetometers are preferably separated 30–40 feet apart and are positioned and towed aft of the platform 30. Ancillary sensors for direction, velocity, and depth sounding relay information to the control vessel 22. This information, in concert with the magnetic data acquisition, is processed and displayed at the control console aboard the control vessel. Continuous data transfer is conducted by telemetery to the computer-interfaces-processors that define and relate the data for presentation in a pictorial format on a CRT terminal. Hard copy is simultaneously obtained with an electrostatic printer. Programming, updating, and positioning of the drone platform is conducted at the control console carried on the control vessel 22. Voice communications with the spotter aircraft is integral to the closed-loop function of the control console. The light aircraft is used to visually observe and direct, by voice communciations, the drone to prime target areas. A vertical oriented camera, aboard the aricraft, photograph target areas on command and the photographs are rectified and related to satellite photographs to establish exact location for salvage intend.

Referring to FIGS. 4 and 5 in combination, it can be seen that as an example, the drone platform 30 may be operated at a velocity of 50 feet per second and that the magnetometers are separated approximately 30 feet, perpendicular, and are positioned and towed aft of the platform. A typical turn radius may be programmed for 180° and the programmed turn is indicated by numeral 34. A typical background magnetic field is indicated in general by numeral 35 while a typical anomaly is indicated by numeral 36. As such, the target zone is indicated by the shaded area characterized by numeral 37 which represents an area approximately 60 feet by 180 feet. The numeral 38 represents the series of sequential transverses carried out by the drone platform 30 while towing the mangetometers 31 and 32. Consequently, the sequential transverses supply a sample every 15 feet on a 15 foot square grid pattern. Velocity of the drone, dependent on the state of the sea, is conducted to 50 feet per second. The parallel sweeps are alternatively 15 feet and 45 feet apart to achieve the grid interrogation. Length of transverses are programmed in relationship to the target zone. Charting of target zones is achieved rapidly. For example, 270,000 square feet area (600 × 450 feet) is analyzed and mapped in as short a period as 5.5 minutes.

Referring now in detail to FIG. 6, the system of the present invention is illustrated in block diagram form wherein the data acquisition portion of the system is illustrated in block 40 representing the drone boat being towed. The drone boat carries drone controls 41, subsystem sensors 42, as previously described as well as the magnetometers sensors 43. Information from the sensors are transmitted to the control vessel indicated by numeral 44 in the system via telemetry circuits 45. Carried on the control vessel is a computer 46 which includes as input devices, a variety of interfacing equipment identified by numerals 47, 48 and 49. Output for the computer is indicated by programming equipment 50, a printer 51, a display terminal 52 and a tape recorder 53. These latter outputs are connected to the computer via a plurality of interfacing equipment indicated by numeral 54, 55 and 56. A control console 57 is used for interrogating the computer and for programming a variety of routines and sub-routines within the computer proper. The aircraft 57 is in communication with the control vessel as previously described.

In view of the foregoing, it can be seen that the novel acquisition system of the present invention provides a novel means for surveying and displaying underwater articles intended to be salvaged. A complete chart or map of the location under observation is produced and proper salvage operation may be commenced.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A waterborne search system for submerged articles comprising:
   a surface platform movable over an extensive target search zone;
   article responsive sensing means operably carried on said platform for detecting the presence of said articles;
   control means carried on said platform and operably coupled to said sensing means for receiving signals from said sensing means upon detection of the articles and for transmitting said signals;
   a control vessel carrying data reduction equipments operable to receive said sensed signals from said control means and for displaying said signals in a meaningful presentation;
   said presentation being in the form of a visual chart display of magnetic anomalies;
   remote control means interconnecting said platform and said control vessel for directing said platform to follow a series of parallel sequential transverses about said target search zone;
   said sensing means including a pair of magnetometers trailing behind said platform in substantially fixed spaced apart relationship;
   said control means carried on said platform and said data reduction equipments on said vessel constituting a data link and further including an observation aircraft in close proximity to said target search zone incorporated into said data link;
   said platform comprising a self propelled boat remotely controlled and directed by said control vessel;
   said platform comprising a pair of skis connected by braces so as to be in fixed parallel spaced apart relationship; and
   said platform further including pivot attachment between said braces and each of said skis and wherein each of said skis includes a concave underside adapted to stabilize directional movement.

* * * * *